United States Patent [19]

Ciniglio

[11] Patent Number: 4,873,938
[45] Date of Patent: Oct. 17, 1989

[54] SOLDERING APPARATUS

[76] Inventor: Alexander J. Ciniglio, Holly Lodge, Ridgeway, Hutton Mount, Brentwood, England

[21] Appl. No.: 878,776

[22] Filed: Jun. 26, 1986

[30] Foreign Application Priority Data

| Jul. 10, 1985 | [GB] | United Kingdom | 8517452 |
| Oct. 22, 1985 | [GB] | United Kingdom | 8526016 |
| Mar. 5, 1986 | [GB] | United Kingdom | 8605389 |
| Jun. 3, 1986 | [GB] | United Kingdom | 8613400 |

[51] Int. Cl.⁴ .......................... B05C 5/02; B05C 5/04
[52] U.S. Cl. .................................. 118/302; 118/300; 118/301; 118/410
[58] Field of Search ................ 118/302, 300, 410, 301

[56] References Cited

U.S. PATENT DOCUMENTS

| 2,821,959 | 2/1958 | Franz | 118/302 |
| 2,933,061 | 4/1960 | Galer | 118/410 X |
| 3,775,156 | 11/1973 | Singer | 118/302 X |
| 3,907,192 | 9/1975 | Grietens | 228/256 |
| 4,573,430 | 3/1986 | Benson et al. | 118/410 X |

FOREIGN PATENT DOCUMENTS

| 1589502 | 6/1973 | Fed. Rep. of Germany . |
| 3022351 | 12/1981 | Fed. Rep. of Germany . |
| 2067448 | 7/1981 | United Kingdom . |

Primary Examiner—John P. McIntosh

[57] ABSTRACT

In a method and apparatus for soldering or tinning wires or component leads, solder is pumped through a nozzle to form a downwardly flowing stream. The wire or lead is passed laterally into the stream and then withdrawn axially to leave a coating of solder on the wire. The wire or lead is angled to the horizontal, pointing upwardly in the direction of withdrawal from the stream.

6 Claims, 3 Drawing Sheets

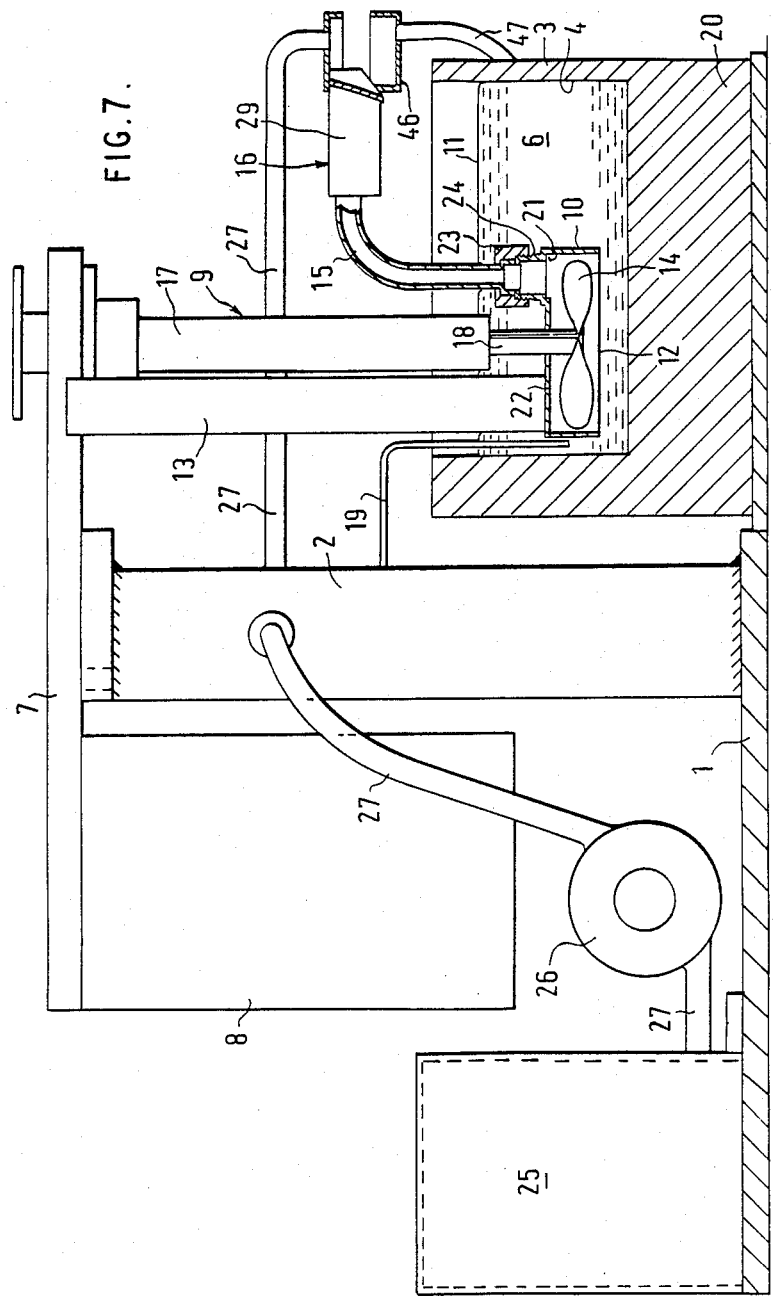

SOLDERING APPARATUS

INTRODUCTION

The present invention relates to a method of applying solder and to an apparatus therefor, more particularly the invention relates to the tinning of wires. The invention is also applicable to the tinning of leads of electrical and electronic components.

To achieve an effective solder joint on a length of wire or the like it is usual to tin an end of the wire, that is to coat it with a thin film of solder before the operation of soldering it to another component, such as a printed circuit board. Some processes specifically require the tinning of wires and leads on resistors, capacitors and other components before they are installed in a printed circuit board in order to meet certain standards of quality.

BACKGROUND TO THE INVENTION

One prior art method of tinning involves dipping wire ends or leads manually into a pot of solder. In another method a bandolier of components is held vertically and passed through a wave of solder, the component leads dipping into the crest of the wave from above.

SUMMARY OF THE INVENTION

A first aspect of the present invention provides a method of tinning a wire or a lead of an electrical or electronic component, which comprises passing the portion of the wire or lead to be tinned through a downwardly flowing stream of solder.

The lead is preferably held at an angle transverse to the direction of flow of the solder.

Preferably the solder is pumped through a downwardly open nozzle, to achieve a substantial flow rate of solder.

The wire is preferably passed sideways into the stream of solder and then withdrawn lengthways. This has been found particularly advantageous in reducing or avoiding the formation of a substantial curtain or tear of solder on the tinned lead.

For tinning a multiplicity of components on a bandolier it is preferable to pass the leads of the components through a curtain of solder, preferably at an angle to the curtain in a generally horizontal plane so that a lead progressively enters and leaves the solder, the portion adjacent the component entering and leaving the curtain first. The leads may be canted to the horizontal to reduce the likelihood of forming a curtain of solder on the lead.

It has been found that a tear may be formed on the lead, particularly the end distal of the component, as it leaves the solder stream. This may be removed by knocking the tear with a piece of wire or other projection placed at the exit from the solder stream.

In another preferred form the coated wire or lead portion is removed from the curtain while being held at an angle above the horizontal, the free end of the wire pointing downwardly. This has been found to reduce substantially the formation of a tear on the wire. The wire may be withdrawn along a line angled to the horizontal. In a preferred form the wire is held at an angle by passing the wire under a stop which is below the level at which the wire is held so that the wire is bent downwardly. The wire may then be withdrawn horizontally whilst a downward slope on the wire is maintained until the wire is free of the stop. Such wires are resilient and will readily spring back to a generally straight configuration when released from the stop.

A second aspect of the invention provides soldering apparatus comprising a bath of solder, means for heating the solder in the bath, a nozzle, a pump and a conduit connecting the pump and the nozzle, the pump operating to pump solder through the nozzle, the nozzle having a downwardly open exit whereby solder is pumped from the nozzle in a downwardly flowing stream.

Preferably the exit is elongate. Preferably the nozzle comprises a chamber having the exit at one end thereof in a bottom wall, the end wall of the chamber adjacent the exit sloping at an angle to the vertical to form an obtuse angle with the bottom wall, the solder stream being directed away from the main body of the wire and the direction of withdrawal.

Preferably a stop is provided below the level of the exit for deforming the wire so that it points downwardly as it leaves the solder stream. Preferably the stop comprises a plate like member which extends laterally from the exit and has a bottom edge which slopes upwardly to a side of the exit. Preferably the plate is curved out of the plane of the exit.

A wire to be soldered may be swept sideways under the bottom edge of the plate so that it is depressed downwardly until it is pointing downwards as it enters the solder stream. It is then withdrawn lengthways from the stream, the bottom edge of the plate in front of the stream holding the wire at an angle to the horizontal.

Preferably a heater is provided in the nozzle. This can serve to liquify any solder which has solidified in the nozzle after the apparatus has been shut down, and also it has been found particularly advantageous in offsetting cooling of the solder as it is pumped through the nozzle, allowing the bath to be run at a lower temperature than would otherwise be the case.

BRIEF DESCRIPTION OF THE DRAWINGS

The invention will be further described by way of example with reference to the accompanying drawings, in which:

FIG. 7 is a side view, partly in section, of an apparatus according the invention incorporating the nozzle of FIG. 1.

DETAILED DESCRIPTION OF PREFERRED EMBODIMENT

Figure 1:
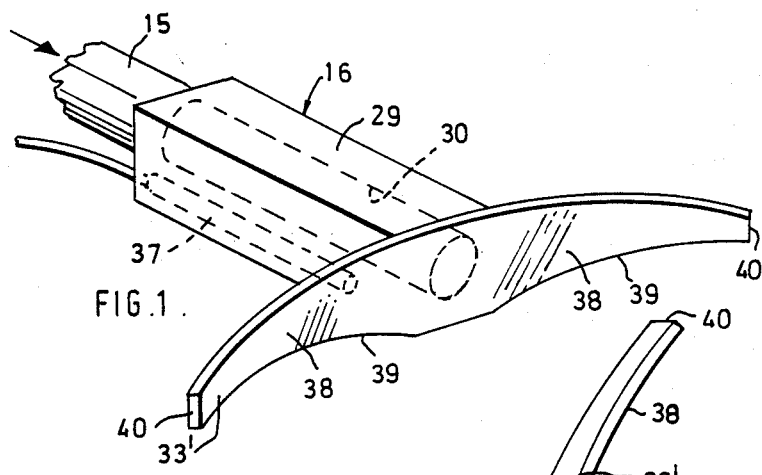
FIG. 1 is a perspective view of a nozzle of an apparatus according to the invention.

Referring to FIG. 7, an apparatus according to the invention comprises a metal base 1 and a central metal support column 2 welded to the base 1. An iron bath 3 is carried on the base 1. Bath 3 has a chamber 4 which contains molten solder 6. Column 2 carries a beam 7 from which depends an electric motor 8 and a pump assembly 9. Pump assembly 9 comprises a pump chamber 10 which is below the surface 11 of the solder and is open at its bottom end 12. Chamber 10 is supported by a column 13 attached to the chamber and the beam 7.

An impellor blade 14 is rotatable within the chamber 10 to pump solder from the chamber up into a conduit 15 which is connected to a nozzle 16, which will be described more fully hereinafter. Impeller blade 14 is mounted on a shaft 18 which is housed in a cylinder 17 extending above the height of the nozzle 16 and supported at its upper end by beam 7. Shaft 18 is rotated by electric motor 8 through a sprocket and chain arrangement (not shown) as is commonly known. Shaft 18 is journalled in bearings (not shown) housed at the upper and lower ends of cylinder 17.

A thermocouple temperature sensor 19 dips into the solder 6 to monitor the temperature thereof. The bath 3 is heated by cartridge heaters (not shown) housed in its base 20. The heaters are regulated according a desired temperature setting and the temperature monitored by sensor 19 as generally known in the art.

Conduit 15 is connected to an opening 21 in the top wall 22 of the chamber 10 by a threaded union cap 23 which screws onto a hollow stud 24 attached to the top wall 22. Conduit 15 is rigid and is welded at its other end to nozzle 16, the conduit extending into the bore 30 of the nozzle 16, thus supporting the nozzle.

Shown in outline in FIG. 7 is a flux delivery system, comprising a reservoir 25, a pump 26 and a conduit 27 connecting the reservoir 25, pump 26 and a nozzle 28. The outlet nozzle 28 is positioned behind the nozzle 16, as viewed in FIG. 7. Flux is pumped through nozzle 28 into a receptacle 46 and flows back to the reservoir 25 along a conduit 47.

Solder is pumped by impellor blade 14 through conduit 15 into nozzle 16 from where it exits in a downwardly flowing stream directed into the bath 4, so that the solder is cycled rapidly by the pump. The stream 45 (FIG. 8) is directed rearwardly of the nozzle 16, that is away from the component to be tinned (FIG. 8).

A cover, not shown, rests on top of the bath 3 and has an aperture to allow the solder stream to pass through into the bath. The cover serves to reduce oxidation and other contamination of the solder 6 in the bath 3.

Referring to FIG. 1, the nozzle 16 comprises a rectangular block 29 of stainless steel having a cylindrical bore 30 into which conduit 15 leads at the one end. The other end of the bore 30 opens into a chamber 33 having an exit 31. An end wall 32 of the chamber is formed by a stainless steel plate 48 welded to the block 29.

Taking the upper surface 34 of the block 29 as being horizontal, an end face 35 of the block surrounding the exit of the bore 30 is vertical. A collar 36 is integrally formed around the upper and side edges of the face 35 and end plate 32 is welded to this collar at an angle of 15° to the end face 35, forming the exit 31 with the lower edge of the face 35.

The exit 31 is preferably about 1 mm by about 13 mm, and the plate 32 is at about 15° to the end face. This forms the solder into a concentrated rearwardly directed jet like curtain as it leaves the nozzle.

Two cartridge heaters 37 are housed in the block 29 for heating the nozzle.

Figure 2:
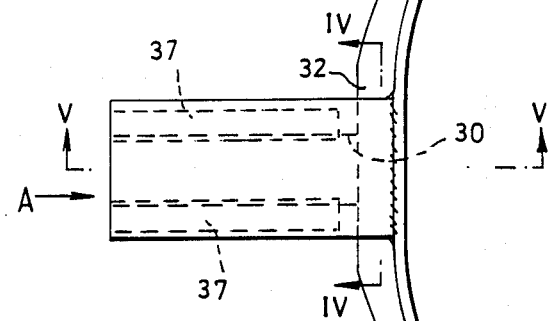
FIG. 2 is a plan view of the nozzle of FIG. 1.
Figure 3:
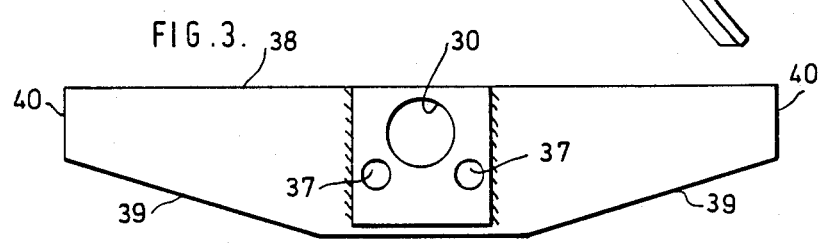
FIG. 3 is an end view on arrow A of FIG. 2 of the nozzle of FIG. 1.
Figure 4:
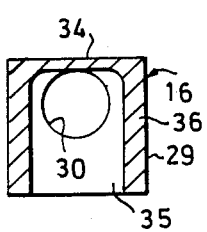
FIG. 4 is a cross-section along the line IV—IV of FIG. 2.
Figure 5:
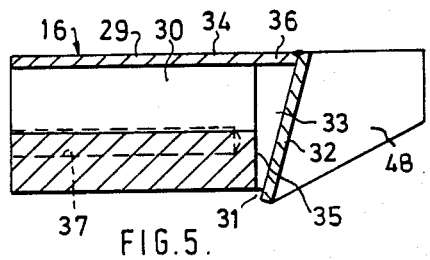
FIG. 5 is a sectional view along the line V—V of FIG. 2.
Figure 6:
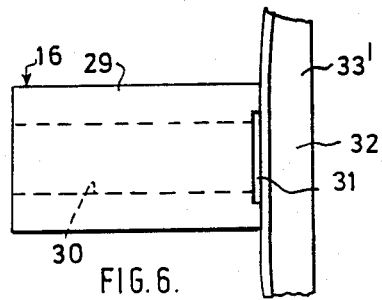
FIG. 6 is a partial underneath view of the nozzle of FIGS. 1 to 5.
Figure 8A:
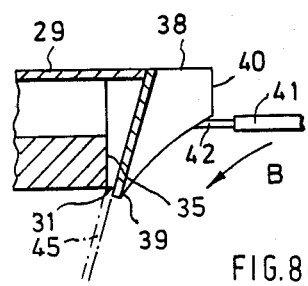
FIGS. 8a to 8d illustrate a soldering process according to the invention.
Figure 8B:
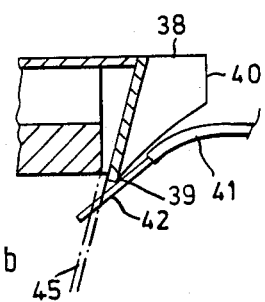
Figure 8C:
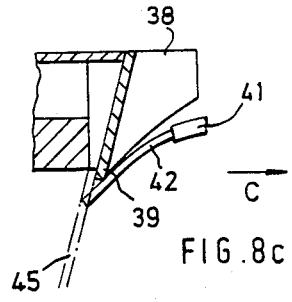
Figure 8D:
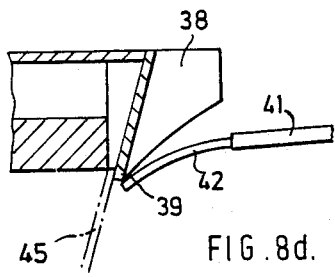

End plate 32 projects 3mm below the level of the exit 31, that is the bottom edge of face 35. As seen in FIGS. 1 and 3, extending sideways from plate 32, and formed integrally therewith are two arms 38 which each have an upwardly sloping lower edge 39. The arms 39 are curved in a circular arc away from plate 32 (FIG. 2).

To use the apparatus, a supply of solder, for example in the form of ingots, is placed in the bath 3, and brought to the required temperature, usually in the range 250° C. to 450° C.[2] and typically 350° C., by heating the bath. The cartridge heaters in the nozzle 16 are activated and solder is pumped through the conduit 15 and nozzle 16, returning to the bath 4.

Flux is pumped through nozzle 28 in a downwardly flowing stream as described previously.

Referring to FIGS. 8a to 8d, a plastics coated wire 41 having a stripped end 42 to be tinned is held in a jig of an indexing machine, not shown, and the lead is swept sideways (arrow B) along a circular arc through the flux stream issuing from nozzle 28 and under the outer end 34 of arm 38. The wire is held so that the stripped end 42 will pass under the end 40 and engage the bottom edge 39 of the arm 38. The body of the wire is held at fixed height so that the stripped end is bent progressively more downwards as it is brought towards the solder stream 45, the end 41 being kept at a constant height and entering the stream sideways on. When the end 42 is in approximately the middle of the stream 45 it is withdrawn (arrow C) lengthways until it is released by the bottom edge of the plate.

Typically the indexing machine will receive a length of wire from a wire reel, cutting the wire to a desired length and stripping the ends of the wire ready for tinning.

By providing arms 39 on each side of the nozzle the apparatus is readily suited to use with indexing machines rotating in either direction. The flux delivery pipe 27, nozzle 28, receptacle 46 and return conduit 47 being moved to the other side of the nozzle 16.

It has been found that the method and apparatus of the invention provide a way of rapidly and mechanically tinning wires without leaving undesirable tears of solder.

Various modifications will be apparent to those in the art and it is desired to include all such modifications as fall within the scope of the invention as defined herein.

I claim:

1. Apparatus for applying solder to a wire or a connecting lead of an electrical or electronic component, comprising a bath for containing molten solder, a pump, a nozzle, a conduit connecting the pump and the nozzle, the pump being arrange to pump solder from the bath to the nozzle via the conduit, wherein the nozzle has a downwardly directed exit such that solder is pumped out of the nozzle to form a downwardly flowing stream of solder, wherein the exit is located at an end of the nozzle and guide means is provided for guiding a wire or lead to be soldered below the level of the exit, and wherein the guide means comprises an arm extending laterally from the nozzle and a lower edge of the arm slopes upwardly away from the exit.

2. Apparatus as claimed in claim 1, wherein heating means is provided in the nozzle.

3. Apparatus as claimed in claim 2, wherein the nozzle comprises a chamber which tapers towards the said exit.

4. Apparatus as claimed in claim 3, wherein the exit is elongate and the chamber walls forming the elongate sides of the exit are angled to one another at approximately 15 degrees.

5. Apparatus as claimed in claim 4, wherein one of the said walls is substantially vertical.

6. Apparatus as claimed in claim 1, wherein an arm is provided on both sides of the nozzle.

* * * * *